(12) United States Patent
Uematsu et al.

(10) Patent No.: US 7,567,800 B2
(45) Date of Patent: Jul. 28, 2009

(54) CONTENT DELIVERY SYSTEM

(75) Inventors: Akira Uematsu, Tokyo (JP); Akihisa Kurashima, Tokyo (JP); Kazuhiro Sakata, Tokyo (JP); Shigehiro Ichimura, Tokyo (JP)

(73) Assignee: NEC Corporation, Tokyo (JP)

( * ) Notice: Subject to any disclaimer, the term of this patent is extended or adjusted under 35 U.S.C. 154(b) by 314 days.

(21) Appl. No.: 10/291,596

(22) Filed: Nov. 12, 2002

(65) Prior Publication Data

US 2003/0092427 A1 May 15, 2003

(30) Foreign Application Priority Data

Nov. 9, 2001 (JP) ............................. 2001-343944

(51) Int. Cl.
*H04L 29/06* (2006.01)
(52) U.S. Cl. .............. 455/414.3; 379/88.17; 455/414.1; 455/420; 709/203; 709/209; 709/219; 709/225
(58) Field of Classification Search ................. 379/351, 379/352, 353, 88.17; 455/414.2, 414.3, 414.4, 455/414.1, 420; 709/232, 238, 203, 209, 709/219, 225
See application file for complete search history.

(56) References Cited

U.S. PATENT DOCUMENTS

| | | | | |
|---|---|---|---|---|
| 5,043,736 A | * | 8/1991 | Darnell et al. ............ 342/357.1 |
| 5,555,446 A | * | 9/1996 | Jasinski ...................... 340/7.21 |
| 5,687,216 A | * | 11/1997 | Svensson .................. 455/412.2 |
| 5,870,561 A | * | 2/1999 | Jarvis et al. ................. 709/238 |
| 5,970,064 A | * | 10/1999 | Clark et al. ................. 370/351 |
| 6,105,027 A | * | 8/2000 | Schneider et al. .............. 707/9 |
| 6,173,322 B1 | * | 1/2001 | Hu ............................. 709/224 |
| 6,345,300 B1 | * | 2/2002 | Bakshi et al. ............... 709/229 |
| 6,345,303 B1 | * | 2/2002 | Knauerhase et al. ........ 709/238 |
| 6,421,733 B1 | * | 7/2002 | Tso et al. .................... 709/246 |

(Continued)

FOREIGN PATENT DOCUMENTS

JP          1-228009          9/1989

(Continued)

OTHER PUBLICATIONS

Chinese Office Action issued Apr. 8, 2005.

(Continued)

*Primary Examiner*—Fan Tsang
*Assistant Examiner*—Hemant Patel
(74) *Attorney, Agent, or Firm*—Dickstein Shapiro LLP

(57) ABSTRACT

In a content delivery system, a gatekeeping apparatus is connected to a network. Prior to the transmission of a request message to a content server, a user terminal transmits an enquiry message to the gatekeeping apparatus. In response, the gatekeeping apparatus makes a decision as to whether or not a content can be retrieved from the content server and performs control on the transmission of the request message according to the decision. If the decision indicates that a content can be retrieved, the user terminal transmits the request message to the content server. In a preferred embodiment, the gatekeeping apparatus makes comparison between user's preference data and server's policy data and determines whether the requested content can be retrieved from the server. A cache memory may be provided in the user terminal or gatekeeping apparatus to store past decisions regarding requested contents.

29 Claims, 14 Drawing Sheets

U.S. PATENT DOCUMENTS

| | | |
|---|---|---|
| 6,539,238 B1 * | 3/2003 | Brouns et al. ............... 455/558 |
| 6,973,485 B2 * | 12/2005 | Ebata et al. ................. 709/219 |
| 2001/0001863 A1 * | 5/2001 | Shuster ...................... 709/203 |
| 2001/0037358 A1 * | 11/2001 | Clubb et al. ................ 709/203 |
| 2002/0010798 A1 * | 1/2002 | Ben-Shaul et al. .......... 709/247 |
| 2002/0023002 A1 * | 2/2002 | Staehelin ..................... 705/14 |
| 2002/0024958 A1 * | 2/2002 | Iveland et al. ............... 370/401 |
| 2002/0026345 A1 * | 2/2002 | Juels ........................... 705/10 |
| 2002/0026517 A1 * | 2/2002 | Watson, Jr. .................. 709/228 |
| 2002/0078203 A1 * | 6/2002 | Greschler et al. ........... 709/225 |
| 2002/0198937 A1 * | 12/2002 | Diwan et al. ................ 709/203 |
| 2003/0004898 A1 * | 1/2003 | McAuliffe et al. ............ 705/80 |
| 2003/0140151 A1 * | 7/2003 | Daenen et al. .............. 709/229 |

FOREIGN PATENT DOCUMENTS

| | | |
|---|---|---|
| JP | 6-149739 | 5/1994 |
| JP | 10-229396 | 8/1998 |
| JP | 11-203153 | 7/1999 |
| JP | 2000-194627 | 7/2000 |
| WO | WO-98/17048 A1 | 4/1998 |
| WO | WO-00/75744 A2 | 12/2000 |
| WO | WO-01/11838 A1 | 2/2001 |

OTHER PUBLICATIONS

Japanese Office Action issued Mar. 28, 2006 (w/ English translation of relevant portions).

* cited by examiner

FIG. 7A

18-1 PREFERENCE TABLE

| DATA TYPE | DATA PRECISION |
|---|---|
| USER LOCATION | THIRD DECIMAL PLACE |
| USER NAME | FIRST NAME AND FAMILY NAME |
| USER PHONE NUMBER | TOLL AREA CODE |

FIG. 7B

22-1 POLICY TABLE

| DATA TYPE | DATA PRECISION |
|---|---|
| USER LOCATION | FIRST DECIMAL PLACE |
| USER NAME | FAMILY NAME |

FIG. 7C

22-2 POLICY TABLE

| DATA TYPE | DATA PRECISION |
|---|---|
| USER LOCATION | FIRST DECIMAL PLACE |
| USER PHONE NUMBER | TOLL, LOCAL AREA CODES, SUBSCRIBER NUMBER |

FIG. 7D

18-2 PREFERENCE TABLE

| DATA TYPE | DATA PRECISION | AREA OF USE |
|---|---|---|
| USER LOCATION | THIRD DECIMAL PLACE | WITHIN CONTENT DELIVERY SYSTEM |

FIG. 7E

22-3 POLICY TABLE

| DATA TYPE | DATA PRECISION | AREA OF USE |
|---|---|---|
| USER LOCATION | FIRST DECIMAL PLACE | CONTENT GENERATION |

FIG. 7F

22-4 POLICY TABLE

| DATA TYPE | DATA PRECISION | AREA OF USE |
|---|---|---|
| USER LOCATION | FIRST DECIMAL PLACE | BEYOND CONTENT DELIVERY SYSTEM |

USER TERMINAL

USER TERMINAL

CONTENT DELIVERY SYSTEM

BACKGROUND OF THE INVENTION

1. Field of the Invention

The present invention relates to a content delivery system.

2. Description of the Related Art

Recent advance in communications technology has enabled user communications terminals including mobile terminals to be provided with diversified non-data as well as data communication functionality. This tendency has culminated in the proliferation of content delivery systems.

As a content delivery system, the location based services system is currently receiving attentions for serving mobile terminals. In the location-based services, the mobile terminal transmits its location information, for example, identifiers of base stations the mobile terminal is currently attached to and field strength data to the content server. In response, the content server formulates a content based on the mobile terminal's current location and delivers it to the mobile terminal. The GPS (global positioning system) is also used in mobile terminals to obtain location information when a mobile terminal accesses a content server.

Computer game terminals provided with communication capability are another example of recently developed communication modes. For serving this type of communication devices, a content delivery system is contemplated in which users access a computer game program maintained in a game server and the computer game terminal control its scenario by sending the position, speed and tilt information of the terminal to the gate server.

What is common to these content delivery systems is that the user terminal is provided with means to extract its own operating conditions and the information about its user and request a content from a content server using parameter data representing such operating conditions and user's information. In response, the content server formulates a content based on the parameter data supplied from the user terminal, and transmits it to the requesting user terminal.

In prior art content delivery systems, when the user terminal requests a content from a content server, it automatically acquires parameter data specified by the user and transmits it to the content server. However, if the content server is not operating or if the requested content is not included in a service list of contents, or if the transmitted parameter data does not contain information necessary to generate a content, the requested content cannot be delivered to the user terminal. In addition, from the viewpoint of user's privacy, a system is contemplated in which parameters are exchanged between the user terminal and the content server under certain conditions for authentication.

Therefore, the prior art content delivery system, parameter acquisition is performed even when a content is not retrievable from the content server. If the parameter data is user's location information and the location information is acquired from GPS receiver of the user's terminal, it is necessary to perform calculations on signals received from GPS satellites, which consumes a substantial amount of power and such consumption of battery power is an important consideration. This applies to a mobile terminal which retrieves location information from the mobile network position data service facility. From the power savings viewpoint, it is undesirable to perform parameter acquisition regardless of whether a content can be retrieved from the network.

SUMMARY OF THE INVENTION

It is therefore an object of the present invention to provide a content delivery system and method that can save user terminals from making unnecessary accesses to the network, so that the network is relieved from unnecessary user traffic.

Another object of the present invention is to provide a content delivery system and method that minimizes the amount of data to be disclosed to the network such as location data which places a considerable burden on the user terminal for acquisition.

According to a first aspect of the present invention, there is provided a content delivery system comprising a content server connected to a network, a gatekeeping apparatus connected to the network, and a user terminal for transmitting a first message to the gatekeeping apparatus and a second message to the content server for requesting a content therefrom. The gatekeeping apparatus is responsive to the first message for making a decision as to whether or not a content can be retrieved from the content server and performing control on the transmission of the second message according to the decision.

In a preferred embodiment, the gatekeeping apparatus monitors status of the content server and performs the control according to the monitored status. In a further preferred embodiment, the user terminal acquires parameter data required by said content server to generate the content if the decision at the gatekeeping apparatus indicates that the content can be retrieved, and formulates the second message with the parameter data for transmission in a request message to the content server. The gatekeeping apparatus makes a decision based on a comparison between preference data of the user terminal and policy data determined by the privacy policies of the content server.

User's access to the network can be reduced by the provision of a cache memory at the user terminal. Before transmitting the first message to the gatekeeping apparatus, the user terminal makes a search through the cache memory for detecting an indication of decision using an indicator of the content as a key. If the search fails, the user terminal transmits the first message to the gatekeeping apparatus and maps an indication of the decision by the gatekeeping apparatus to the content's indicator in the cache memory. If the search succeeds, the user terminal acquires parameter data required by the content server to generate the content if the decision indication in the cache memory indicates that the content can be retrieved.

The gatekeeping apparatus is able to reduce its access to the network by the provision of a cache memory in the gatekeeping apparatus. When the gatekeeping apparatus receives the first message from the user terminal, it makes a search through the cache memory for detecting an indication of decision using a pair of an indicator of the content and the address of the user terminal as a key. If the search fails, the gatekeeping apparatus acquires policy data from the content server, making the decision by comparing the acquired policy data with the preference data contained in the first message and mapping an indication of the decision to the pair of the content's indicator and the user terminal address in the cache memory. If the search succeeds, the gatekeeping apparatus performs control on the transmission of the second message from the user terminal according to the decision indication in the cache memory.

The gatekeeping apparatus may transmit a notification message to the user terminal for indicating the policy data of the content server. The user terminal responds to this notification message by displaying its policy data for asking a user to determine whether the policy terms indicated by the policy data are acceptable and acquires parameter data according to the policy data if an acceptance indication is given by the user.

According to a second aspect of the present invention, there is provided a method of delivering contents via a communications network from a content server to a user terminal, comprising the steps of (a) transmitting a first message from the user terminal to a gatekeeping apparatus, (b) receiving the first message at the gatekeeping apparatus and making a decision as to whether or not a content is retrievable from the content server, (c) transmitting a notification message from the gatekeeping apparatus to the user terminal for indicating the decision, and (d) receiving the notification message at the user terminal and transmitting a second message to the content server only if the decision contained in the notification message indicates that the content is retrievable.

BRIEF DESCRIPTION OF THE DRAWINGS

The present invention will be described in detail further with reference to the following drawings, in which:

FIGS. 7A to 7F are illustrations of details of the user parameter memory and the policy table of FIG. 4;

DETAILED DESCRIPTION

Figure 1:
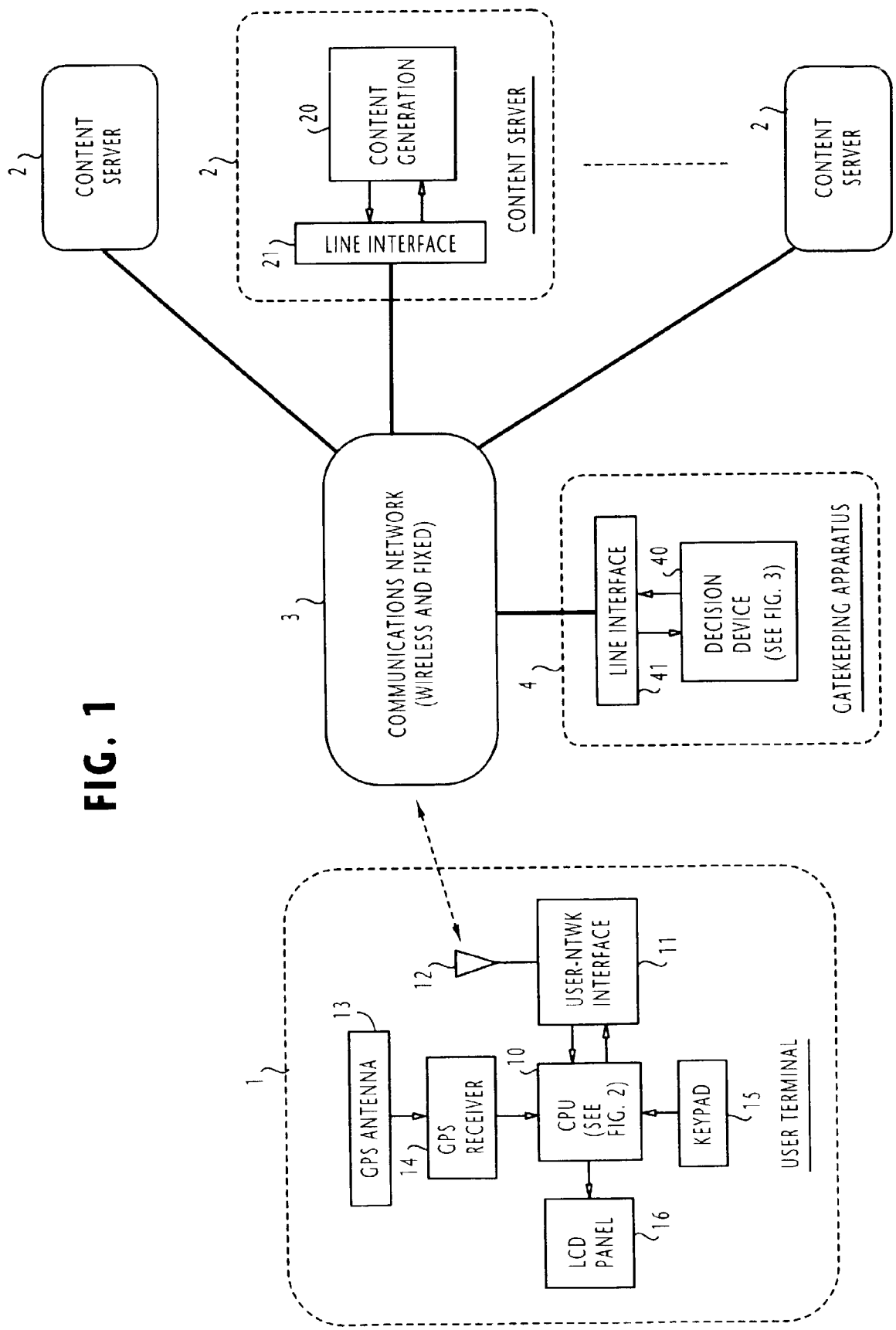
FIG. 1 is a block diagram of a content delivery system according to a first embodiment of the present invention.

FIG. 1 shows an example content delivery system according to a first embodiment of the present invention. The content delivery system is comprised of a user terminal 1, such as a mobile terminal, and a plurality of content servers 2 connected to a communications network 3 which includes wireless and fixed networks and IP networks. Further connected to the network 3 is a gatekeeping apparatus 4, which operates as a gatekeeper between the user terminal 1 and the content servers 2 as described in detail below.

As a typical example, the user terminal 1 is shown as a mobile terminal, comprising a CPU 10 which is connected to the network 3 via a user-network interface 11 and antenna 12. As a typical example, the user terminal is provided with a GPS (Global Positioning System) antenna 13 and a GPS receiver 14. Signals from GPS satellites are collected by the GPS antenna 13 and processed in the GPS receiver 14 to represent the location information of the mobile terminal in the geographic coordinate system of latitude and longitude. Instead of the GPS system, the user terminal may obtain such location information from a mobile network in a well known manner. The present invention could equally be as well applied to user terminals connected to a fixed network.

When the user wishes to access a content in a content server 2, the user enters an indicator of the content and the network address of the content server 2, or URI (universal resource indicator) of the content on the Internet, into the CPU 10 through the keypad 15. A content received from the network is displayed on an LCD panel 16.

Each content server 2 includes a content generation means 20 connected to the network 3 through a line interface 21 to generate and transmit a content in response to a request message from the user terminal.

Gatekeeping apparatus 4 controls user traffic to the content servers 2 by constantly monitoring the status of each content server and/or retrieving policy data from a requested content server for comparison with user preference data and transmitting a grant/reject message to the user terminal according to the monitored server status and/or the result of the comparison. For this purpose, the gatekeeping apparatus 4 includes a decision device 40 connected to the network 3 through a line interface 41.

Figure 2:
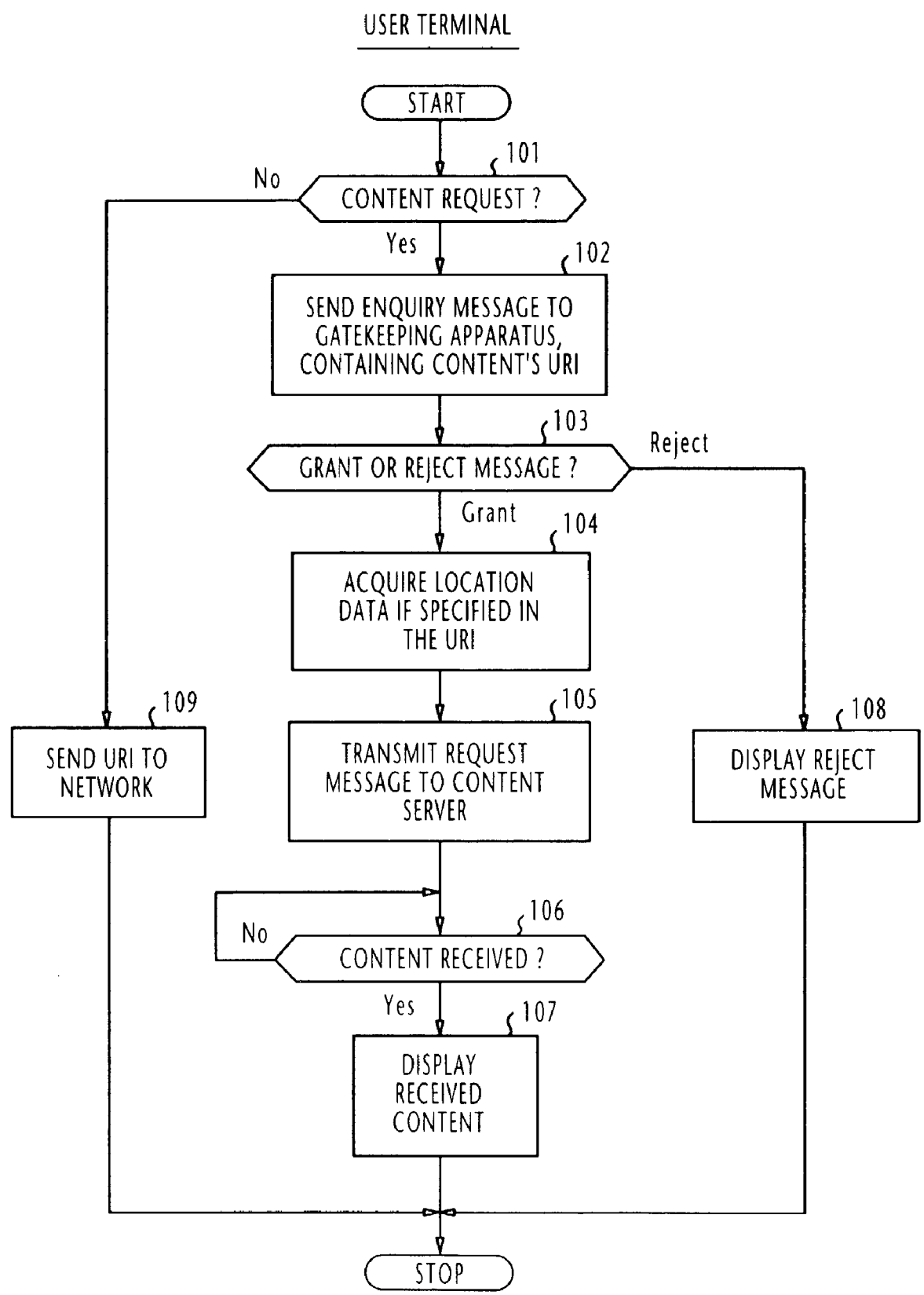
FIG. 2 is a flowchart of the operation of the user terminal of FIG. 1.
Figure 3:
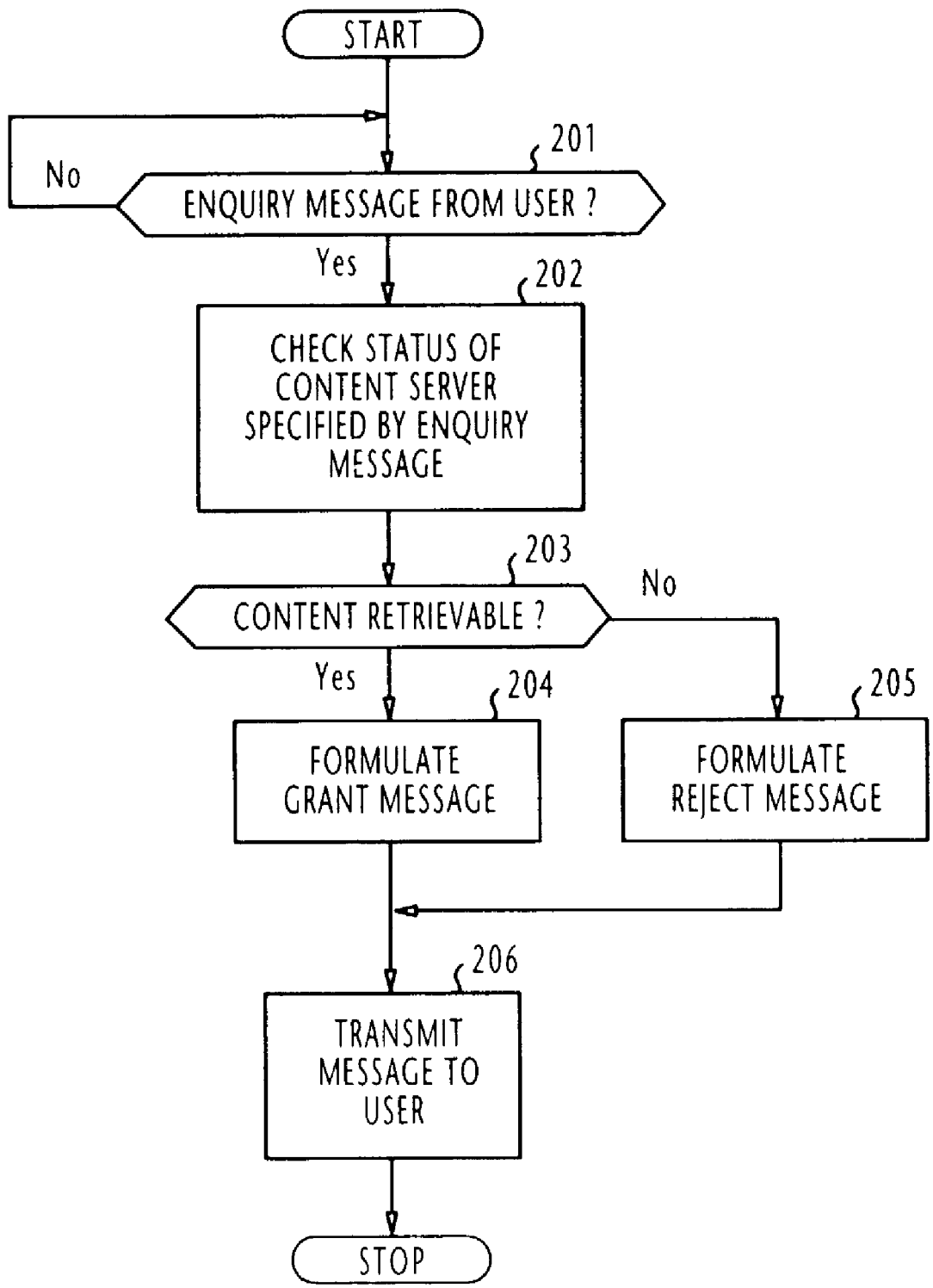
FIG. 3 is a flowchart of the operation of the gatekeeping apparatus of FIG. 1.

The operations of the CPU 10 and the decision device 40 of FIG. 1 proceed according to flowcharts shown in FIGS. 2 and 3, respectively.

In FIG. 2, when a user wishes to access a content in a certain content server, the user enters the URI of the content into the CPU 10 through the keypad (step 101). CPU 10 analyses the entered URI and determines whether the URI specifies personal information of the user, or parameter data such as user's current location, user name and/or user's age.

If the CPU determines that no parameter data is specified in the URI, flow proceeds to step 109 to send the entered URI to the network 3 and terminates the routine. If the CPU determines that parameter data is specified in the entered URI, flow proceeds to step 102 to formulate and transmit an enquiry message to the network 3, containing the address of the gatekeeping apparatus 4 and the URI of the content the user requests from a content server. This enquiry message propagates through the network and routed to the gatekeeping apparatus 4. User terminal 1 monitors the user-network interface 11 to wait for a reply message from the gatekeeping apparatus (step 103).

Referring to FIG. 3, the enquiry message from the user terminal is received by the gatekeeping apparatus (step 201). Decision device 40 checks the status of the content server specified by the enquiry message (step 202) and determines whether the requested content can be retrieved from the specified content server (step 203).

If the specified content server is available, i.e., currently in operation, the decision device determines that the requested content can be retrieved from the specified content server and proceeds from step 203 to step 204 to formulate a "grant" message. If the specified content server is not available for some reason, the decision device 40 determines that the requested content is not retrievable and proceeds from step 203 to step 205 to formulate a "reject" message. At step 206, the gatekeeping apparatus 4 transmits the grant or reject message to the requesting user terminal.

Returning to FIG. 2, if the reply message from the gatekeeping apparatus indicates that the user's request is granted, the CPU 10 proceeds from step 103 to step 104 to acquire the parameter data which has been specified in the entered URI by the user and detected by the CPU at step 101.

If the user location is specified as one of the parameter data, the CPU 10 proceeds to acquire the user's location information from the GPS receiver 14 or from an external source such as the location information service of a mobile network, and formulate a request message with the acquired location information and other parameter data and the desired content's URI and transmits the request message to the network 3 (step 105).

The request message is routed through the network 3 to the desired content server, where the requested content is generated in the content generation means 20 and transmitted back to the network 3. The transmitted content will be received by the user terminal at step 106 and displayed on the LCD panel (step 107). If the reply message from the gatekeeping apparatus 4 is a reject message, flow proceeds from step 103 to step 108 to display the reject message on the LCD panel.

As a result, futile access to irretrievable content is blocked off, and the network is relieved from useless traffic. Additionally, if the user terminal acquires its location data from an external source such as the location information service of a mobile network, the gatekeeping function of the present invention has a further effect of saving the user terminal from making an unnecessary access to the external source, which further serves to reduce the unnecessary network traffic. Additionally, the gatekeeping function of the present invention has the effect of protecting user's personal information from unnecessary accesses to the network.

Figure 4:
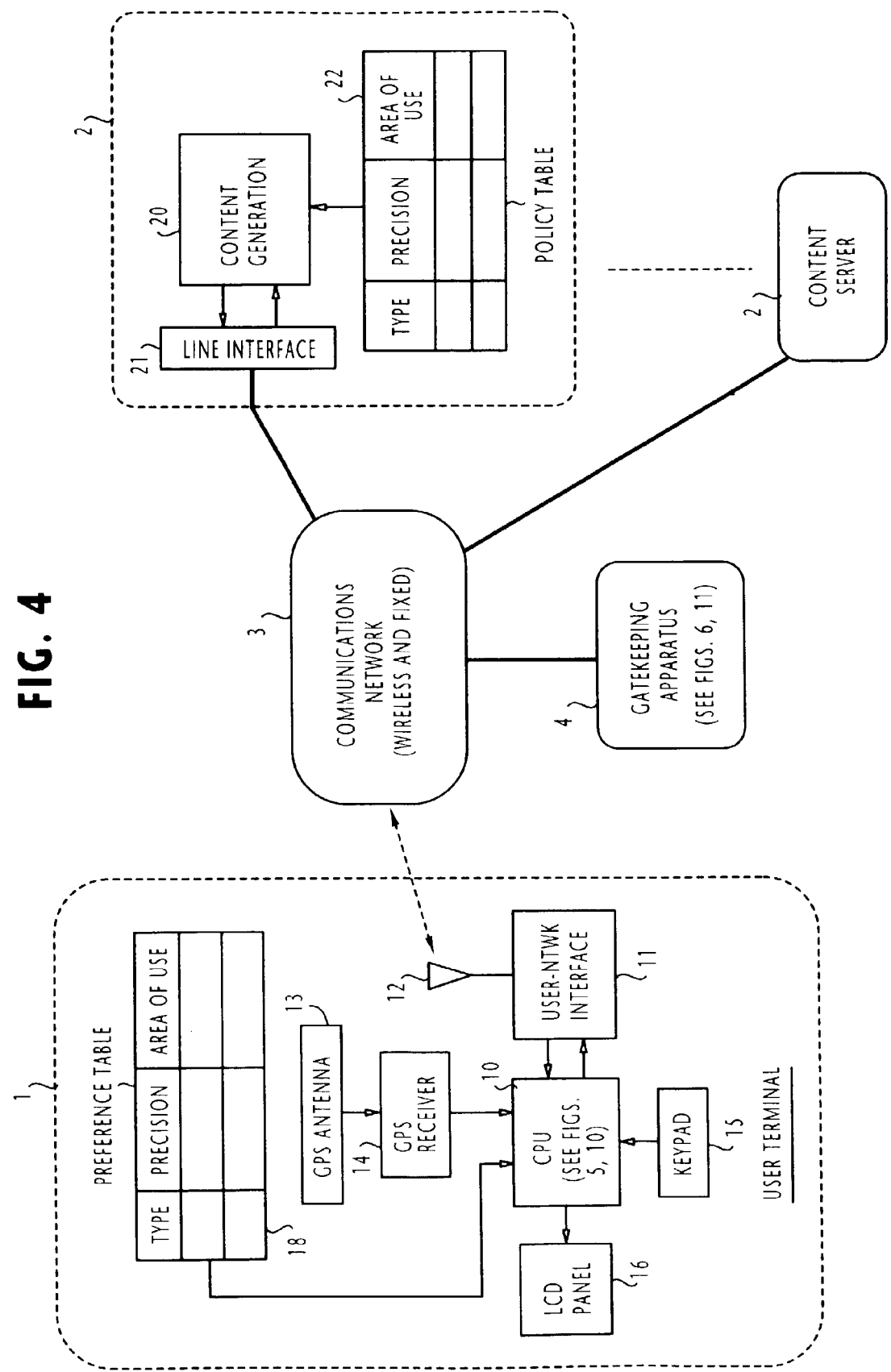
FIG. 4 is a block diagram of a content delivery system according to a second embodiment of the present invention, in which each content server is provided with a policy table for storing server policy data to be matched with user preference data in the gatekeeping apparatus.

In a second embodiment of the present invention shown in FIG. 4, the user terminal 1 is provided with a preference table 18 that contains type of parameter data which can be disclosed to the network. Preference table 18 further includes the precision of parameter data and allowed usage of parameter data for each parameter data type.

Each of the content servers 2 includes a policy table 22 in which a set of server policy data are stored as access requirements which the content server requests the user to accept. The policy data are privacy criteria the content server has established according to its privacy and security policies, which would normally require the disclosure of personal information. Before proceeding with the transmission of a content request from the user terminal, a matching process is performed in the gatekeeping apparatus 4 between the user preference data and the server policy data.

Figure 5:
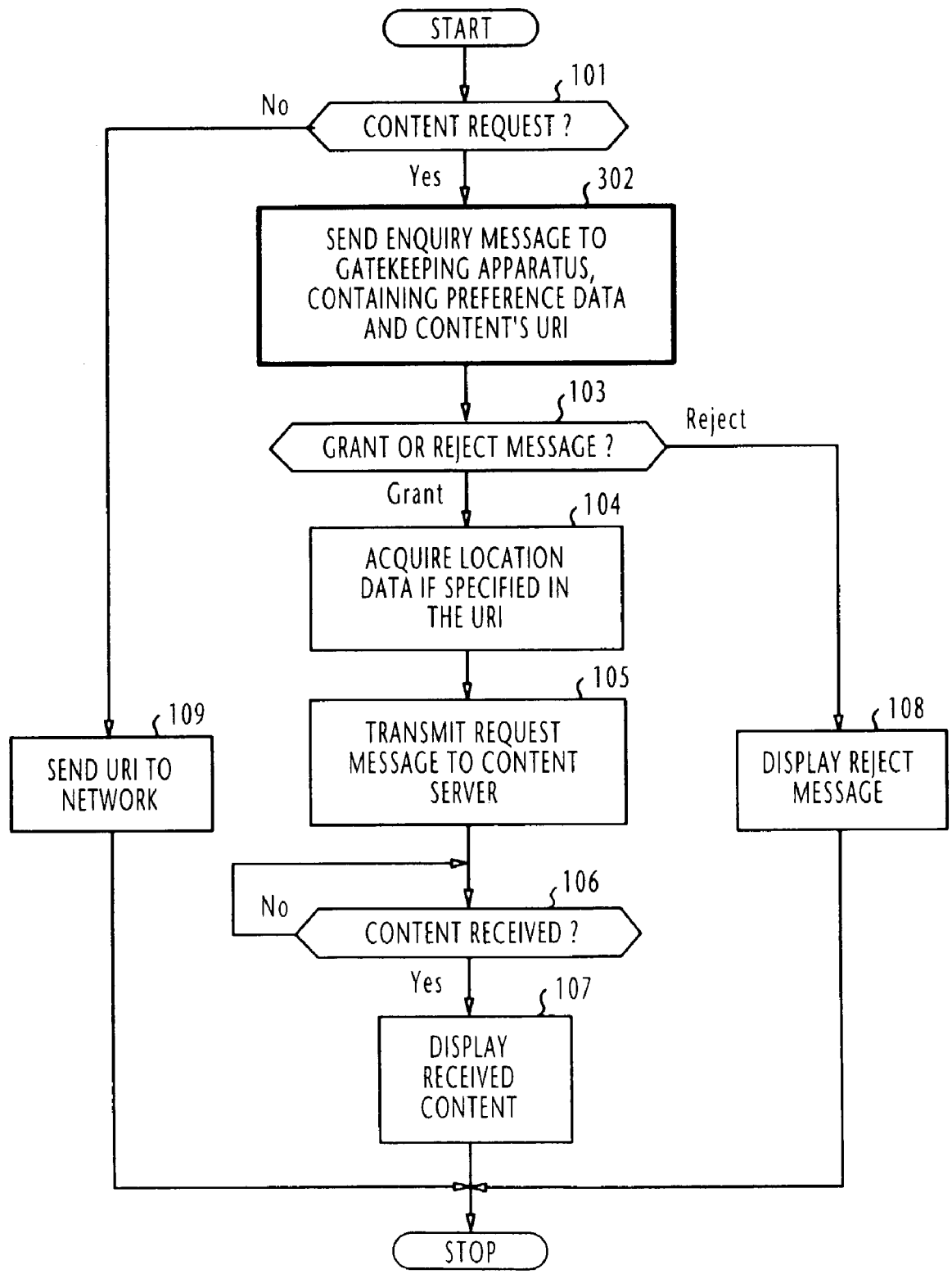
FIG. 5 is a flowchart of the operation of the user terminal of FIG. 4.
Figure 6:
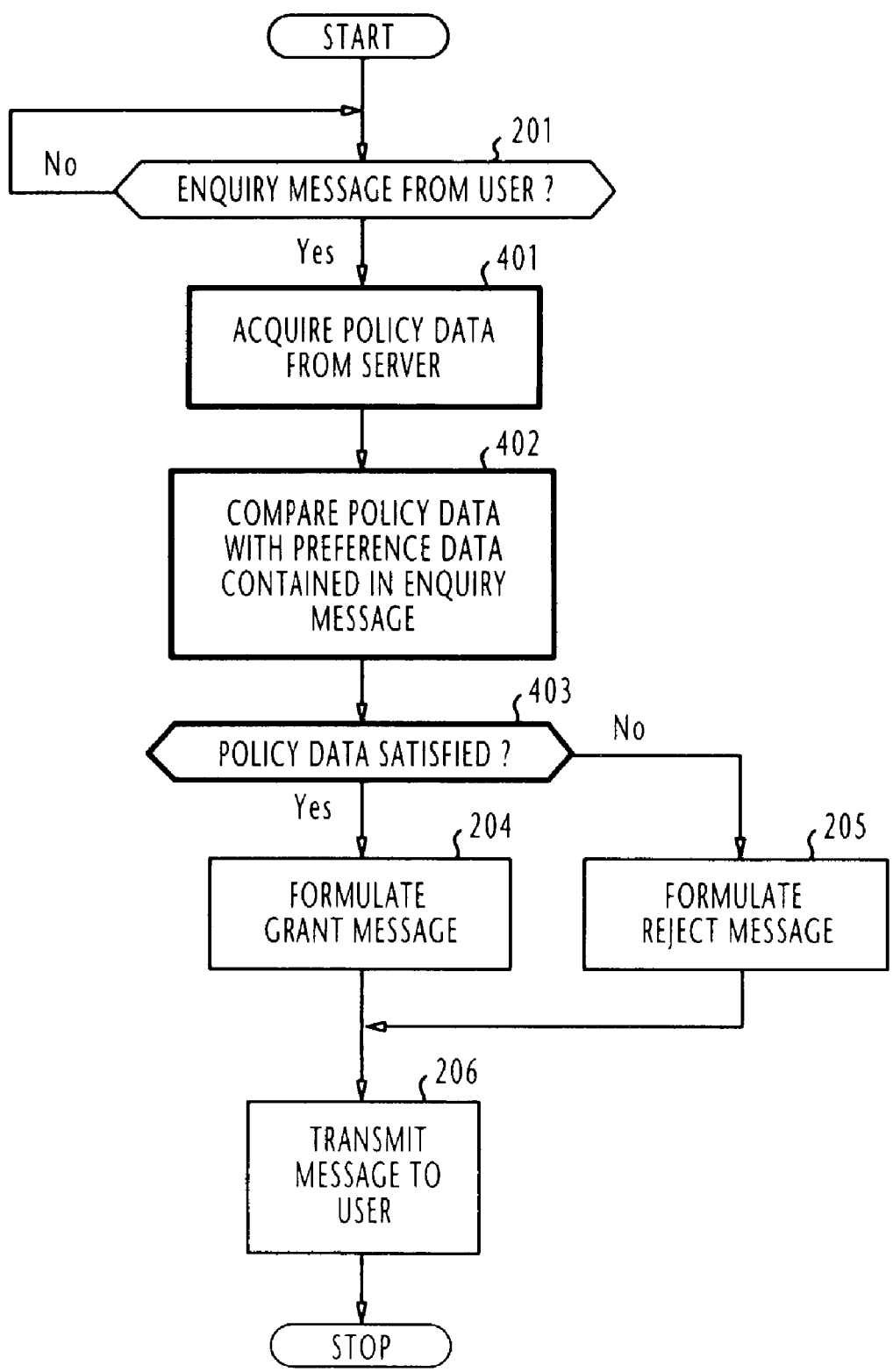
FIG. 6 is a flowchart of the operation of the gatekeeping apparatus of FIG. 4.

The operations of the CPU 10 and the decision device 40 of FIG. 4 proceed according to the flowcharts of FIGS. 5 and 6, respectively, in which parts corresponding in significance to those in FIGS. 2 and 3 are marked with the same numerals, the description thereof being omitted for simplicity.

In FIG. 5, the CPU 10 proceeds to step 302 when the decision at step 101 is affirmative and transmits an enquiry message to the gatekeeping apparatus 4, containing the URI of the requested content and the data stored in the preference table 18, and waits for a reply (step 103).

Preferably, the preference data contained in the enquiry message are described according to the specification called the Platform for Privacy Preferences Project known as P3P, which is a machine-readable vocabulary and syntax for expressing a Web site's data management practice.

When the gatekeeping apparatus 4 receives this enquiry message (step 201, FIG. 6), the decision device 40 proceeds to step 401 to access the requested content server and acquires its requesting parameter from the policy table 22. The server parameter information is preferably written according to P3P protocol.

At step 402, the decision device 40 compares the preference data contained in the enquiry message the policy data for a match (step 403). If all the preference data satisfy the policy data requested by the server, the decision at step 403 is affirmative and the CPU formulates and transmits a grant message to the user terminal (steps 204, 206). Otherwise, flow proceeds to steps 205 and 206 to transmit a reject message.

In FIG. 5, if the reply message from the gatekeeping apparatus 4 is a grant message (step 103), flow proceeds to step 104 to acquire the parameter data specified by the URI. If the user location information is specified, location data is acquired as described previously and a request message is formulated with the parameter data and transmitted to the content server. Otherwise, the CPU proceeds to step 108 to display the reject message.

FIGS. 7A to 7F show examples of preference data stored in the preference table 18 and policy data stored in the policy table 22.

In FIG. 7A, the preference table 18-1 includes a plurality of entries each having a plurality of fields. The leftmost field of each entry indicates the parameter type, or category of the information such as user location information, user name and user phone number and the second entry of each entry specifies the parameter precision, i.e., a degree of precision with which its information can be disclosed to the network. In this example, the user location entry indicates that the third decimal place is the highest degree of precision with which the position data value can be transmitted to the network. The user name entry indicates that the user allows the disclosure of user's full name and the phone number entry indicates that it is only the toll area code that can be disclosed to the network.

Two examples of the policy table 22 are shown in FIGS. 7B and 7C. In FIG. 7B, the content server requires that information types include user location information with a precision to the first decimal place and user name with a precision of only family name. In FIG. 7C, the content server requires that information types are user location information with a precision of first decimal place and user's full phone number.

If the content server imposes the same policy data as those shown in FIG. 7B, the comparison between the preference data of FIG. 7A and the policy data of FIG. 7B at step 403 results in an affirmative decision since all the user preference data satisfy all the server policy data. On the other hand, if the server policy data are as shown in FIG. 7C, the comparison with the user preference data results in a negative decision since data precision of phone number in the preference table 7A does not satisfy the requirement of precision specified in policy table 7C.

In FIG. 7D, the preference table 18-2 has only one entry (i.e., user location information) with an additional field that indicates the area of use of the location data. In this example, the user location entry indicates that the third decimal place is the highest degree of precision and that the user allows it to be used within the boundary of the content delivery system.

In FIG. 7E, the content server requires that user location data has a precision to the first decimal place and it is only used for the purpose of generating a content. In FIG. 7F, the content server requires that user location data has a precision of first decimal place, but indicates that it may be used beyond the content delivery system. Therefore, if the comparison is made between FIGS. 7D and 7E at step 403, the decision is affirmative and if the comparison is made between FIGS. 7D and 7F, the decision is negative.

Figure 8:
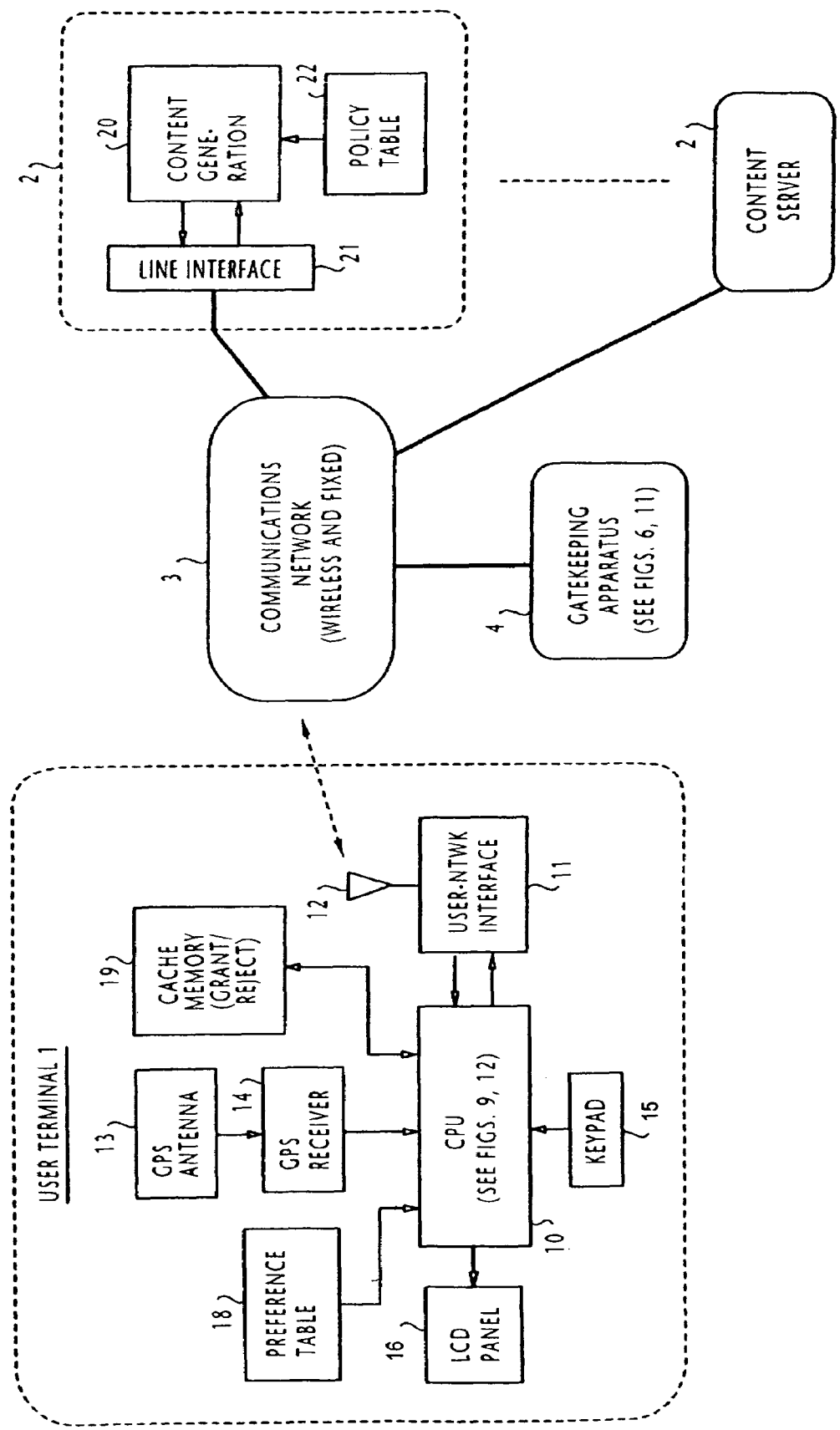
FIG. 8 is a block diagram of a content delivery system according to a third embodiment of the present invention, in which the user terminal is provided with a cache memory.

A third embodiment of the present invention is shown in FIG. 8 in which the user terminal 1 is provided with a cache memory 19. The CPU 10 operates according to a flowchart shown in FIG. 9 and the gatekeeping apparatus 4 operates in the same manner as in the previous embodiment.

Figure 9:
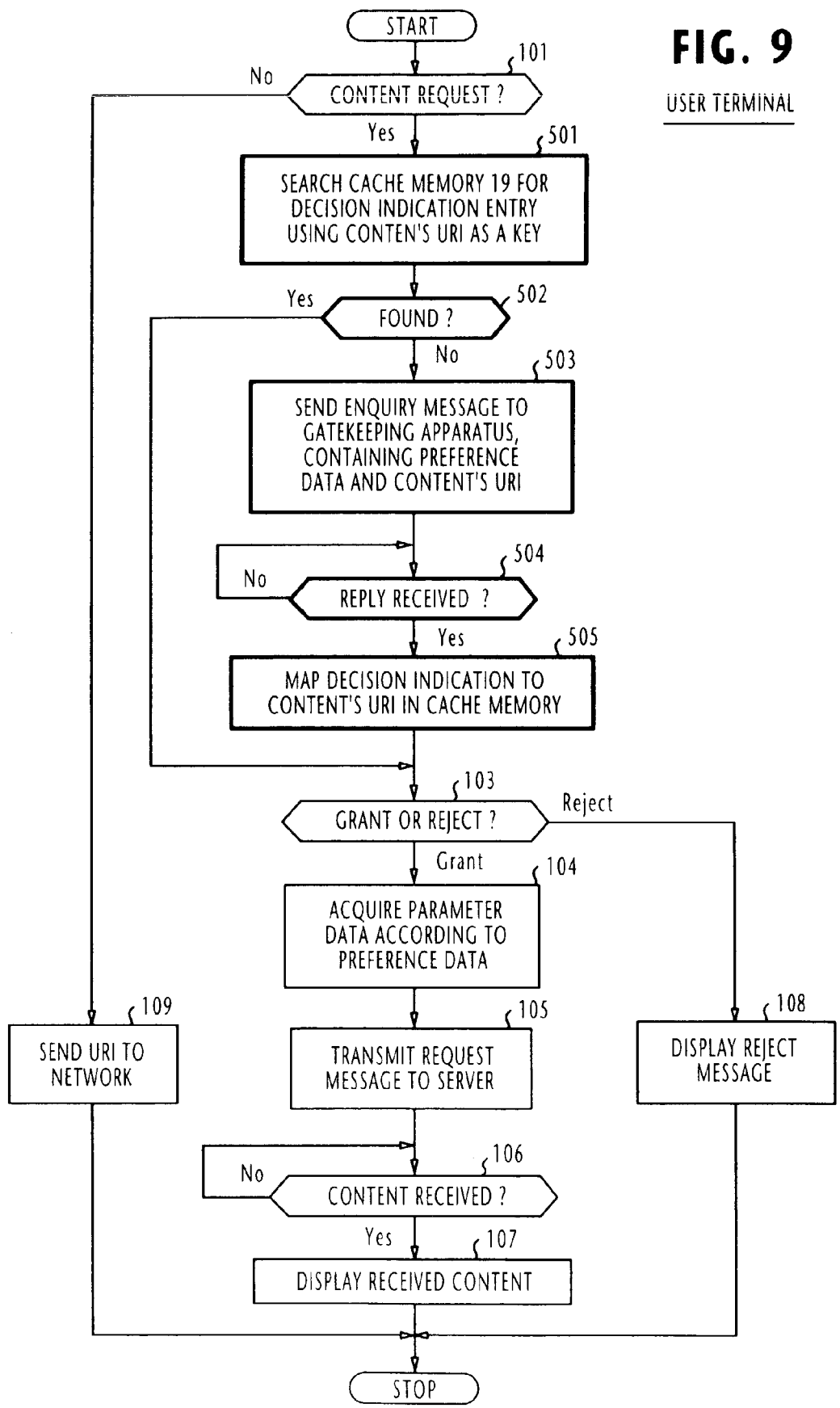
FIG. 9 is a flowchart of the operation of the user terminal of FIG. 8.

In FIG. 9 in which parts corresponding to those in FIGS. 2 and 5 are marked with the same numerals, the CPU 10 executes step 501 when a content request is entered through the keypad (step 101) and makes a search through the cache memory 19 for a grant/reject indication entry by using the content's URI as a key. If no indication entry is found in the cache memory 19 with respect to that URI (step 502), flow proceeds to step 503 to transmit an enquiry message to the network 3, containing the data of preference table 18 and the content's URI, and the CPU waits for a reply message from the gatekeeping apparatus at step 504.

In response to this enquiry message, the decision device at the gatekeeping apparatus successively performs steps 401 and 402 (see FIG. 6) for making a decision at step 403 to formulate a reply message for transmission to the user terminal, in the same way as described above.

If the user terminal receives a reply message, flow proceeds from step 504 to step 505 to map the grant/reject indication contained in the received message to the content's URI in one entry of the cache memory 19. CPU 10 proceeds from step 505 to decision step 103 to check to see if the reply message contains a grant indication or a reject indication. Depending on the decision at step 103, the CPU executes steps 104 to 107 or step 108.

If step 502 indicates that a grant/reject indication is found in the cache memory 19 for the intended content, flow proceeds to step 103 to check to see if the stored indication is a grant or a reject indication. Therefore, the CPU operates according to the decision of step 103 in the same manner as described above.

Each entry of the cache memory 19 is erased when a predetermined interval of time has lapsed following the time at which the entry is created.

The provision of the cache memory at the user terminal has the advantageous effect of reducing user's accesses to the gatekeeping apparatus as well as accesses from the gatekeeping apparatus to content servers if the user requests contents repeatedly from content servers within the cache update interval.

Figure 10:
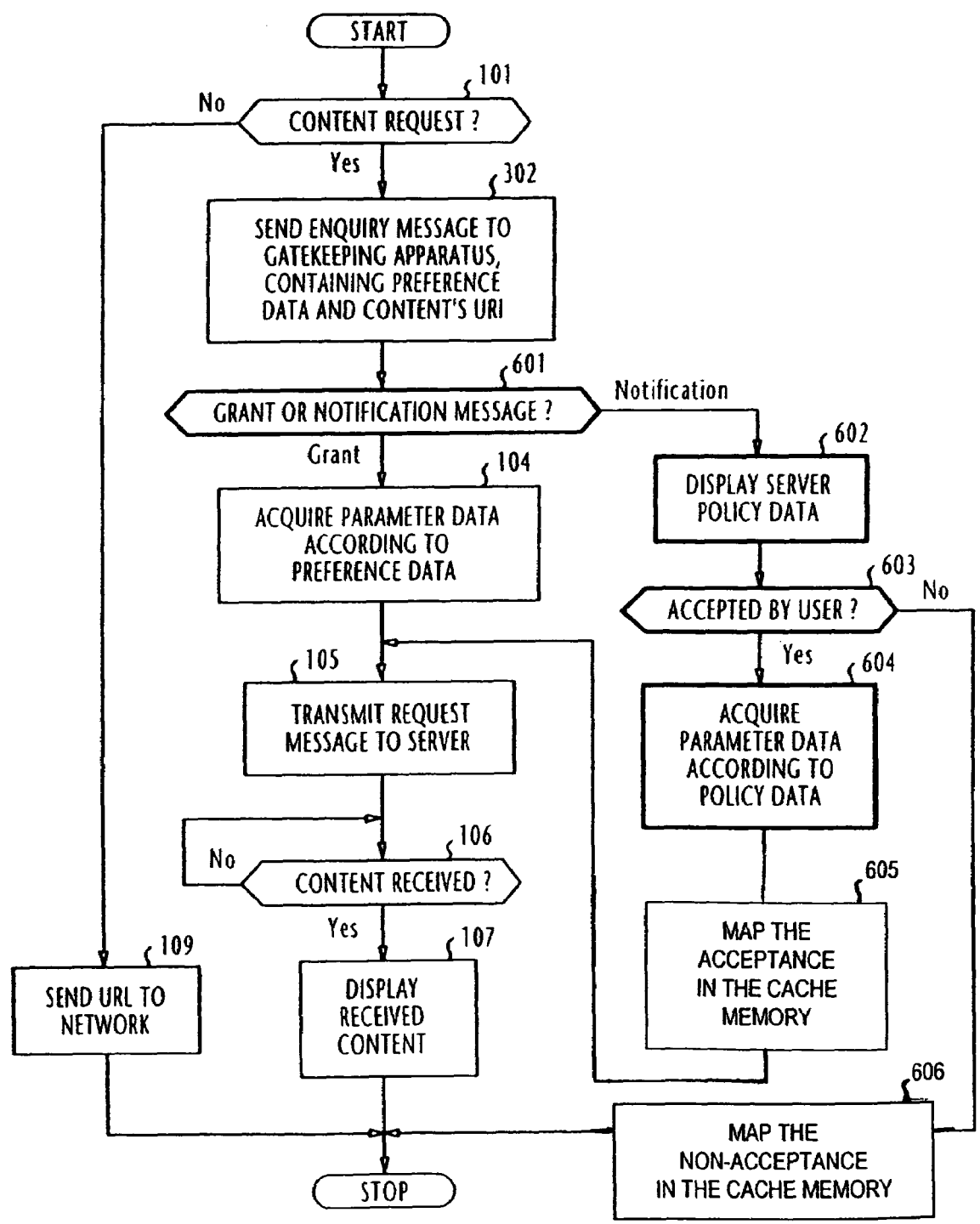
FIG. 10 is a flowchart of the user terminal of FIG. 4 operating according to a modified embodiment of FIG. 5.
Figure 11:
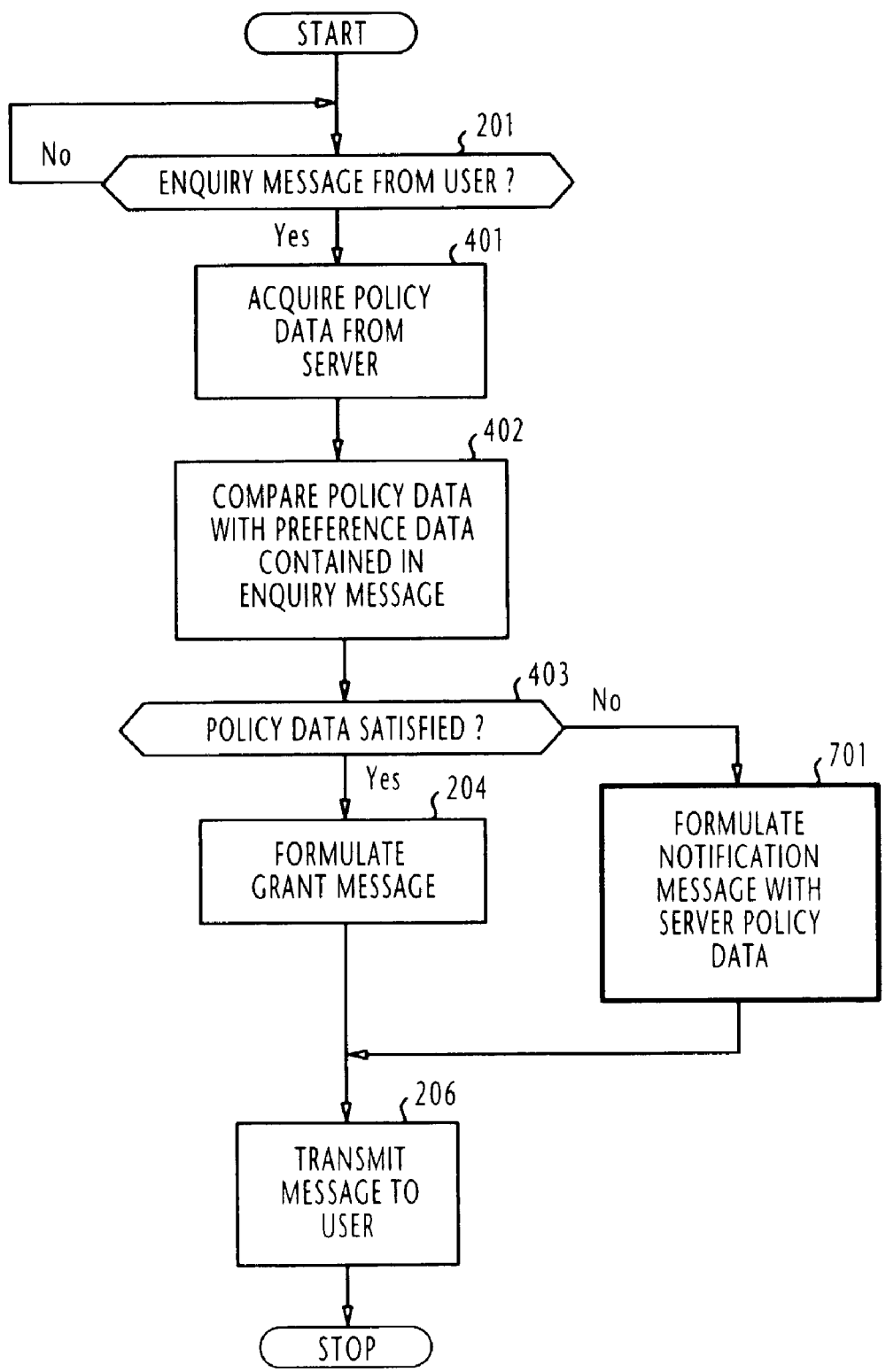
FIG. 11 is a flowchart of the gatekeeping apparatus of FIG. 4 operating according to a modified embodiment of FIG. 6.

Flowcharts of FIGS. 5 and 6 are modified as shown in FIGS. 10 and 11, respectively, in which parts corresponding in significance to those of FIGS. 5 and 6 are marked with the same numerals.

In FIG. 10, the CPU 10 proceeds from step 302 to decision step 601 after transmitting an enquiry message to the gatekeeping apparatus for a reply therefrom. When a reply is received, the CPU 10 checks to see if the reply is a grant message or a notification message which contains server's policy data.

In response to the user's enquiry message (step 201, FIG. 11), the gatekeeping apparatus performs steps 401 and 402 and determines, at step 403, whether the preference data satisfy the server's policy data. If the decision is negative at step 403, flow proceeds to step 701 to formulate a notification message with the policy data stored in the policy table 22 and transmit the message to the user terminal at step 206.

In FIG. 10, if the reply from the gatekeeping apparatus is a notification message, the CPU 10 proceeds from step 601 to step 602 to provide a display of the policy data contained in the notification message in order to ask the user whether or not the terms indicated by the displayed policy data are acceptable. If the user accepts the terms of the server's policy, he enters an acceptance indication to the CPU 10. If this is the case, the decision at step 603 is affirmative, and flow proceeds to step 604 to acquire parameter data specified in the URI and map the acceptance indication to the content's URI in the cache memory (step 605). The acquired parameter data is transmitted in a request message to the content server (step 105). If the decision is negative at step 603, the CPU proceeds to step 606 to map the non-acceptance indication to the content's URI in the cache memory and terminates the routine.

Figure 12:
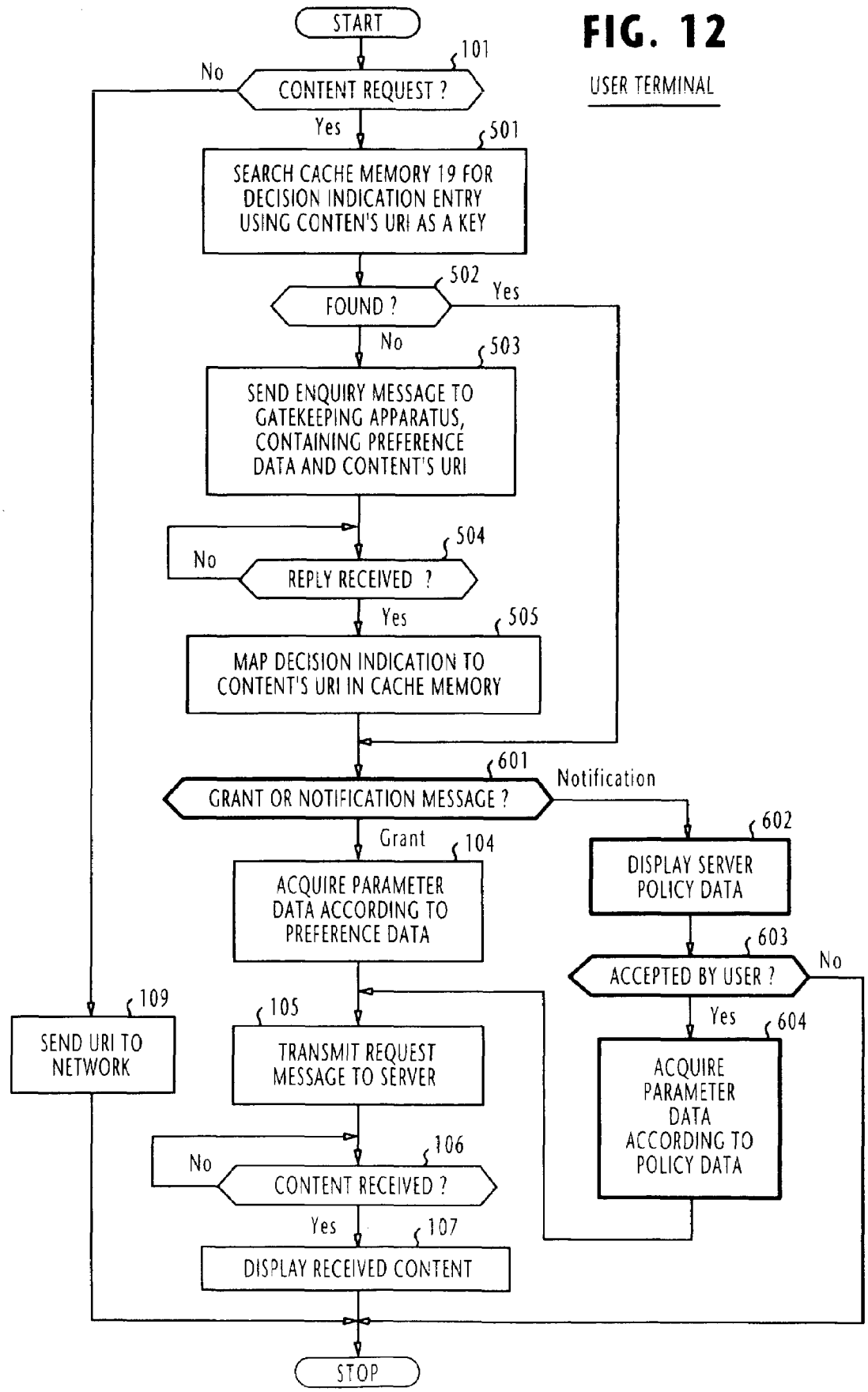
FIG. 12 is a flowchart of the user terminal of FIG. 8 operating according to a combined form of the embodiments of FIGS. 9 and 10.

This optional feature can be combined with the feature of cache memory 19 as illustrated in a flowchart shown in FIG. 12, in which parts corresponding in significance to those in FIGS. 9 and 10 are marked with the same numerals. In this case, the CPU executes step 601 following step 502 or 505.

Figure 13:
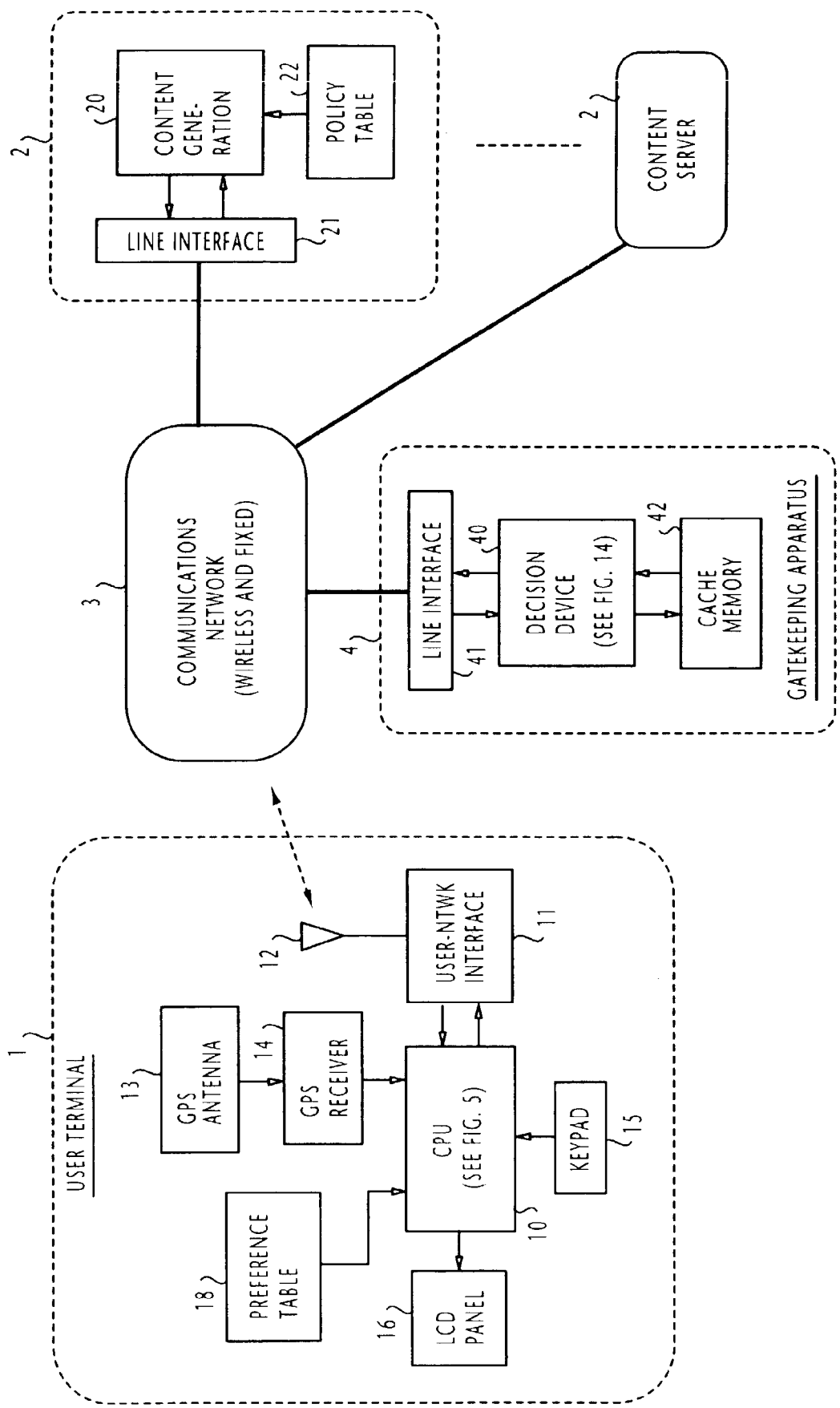
FIG. 13 is a block diagram of a content delivery system according to a fourth embodiment of the present invention in which the gatekeeping apparatus is provided with a cache memory.

A content delivery system according to a fourth embodiment of the present invention is shown in FIG. 13. In this system, traffic between the gatekeeping apparatus and content servers 2 can be reduced by providing the gatekeeping apparatus 4 with a cache memory 42. In this system the user terminal 1 is of identical configuration to that of FIG. 4. The operation of the gatekeeping apparatus is illustrated in a flowchart shown in FIG. 14, in which parts corresponding in significance to those in FIG. 6.

Figure 14:
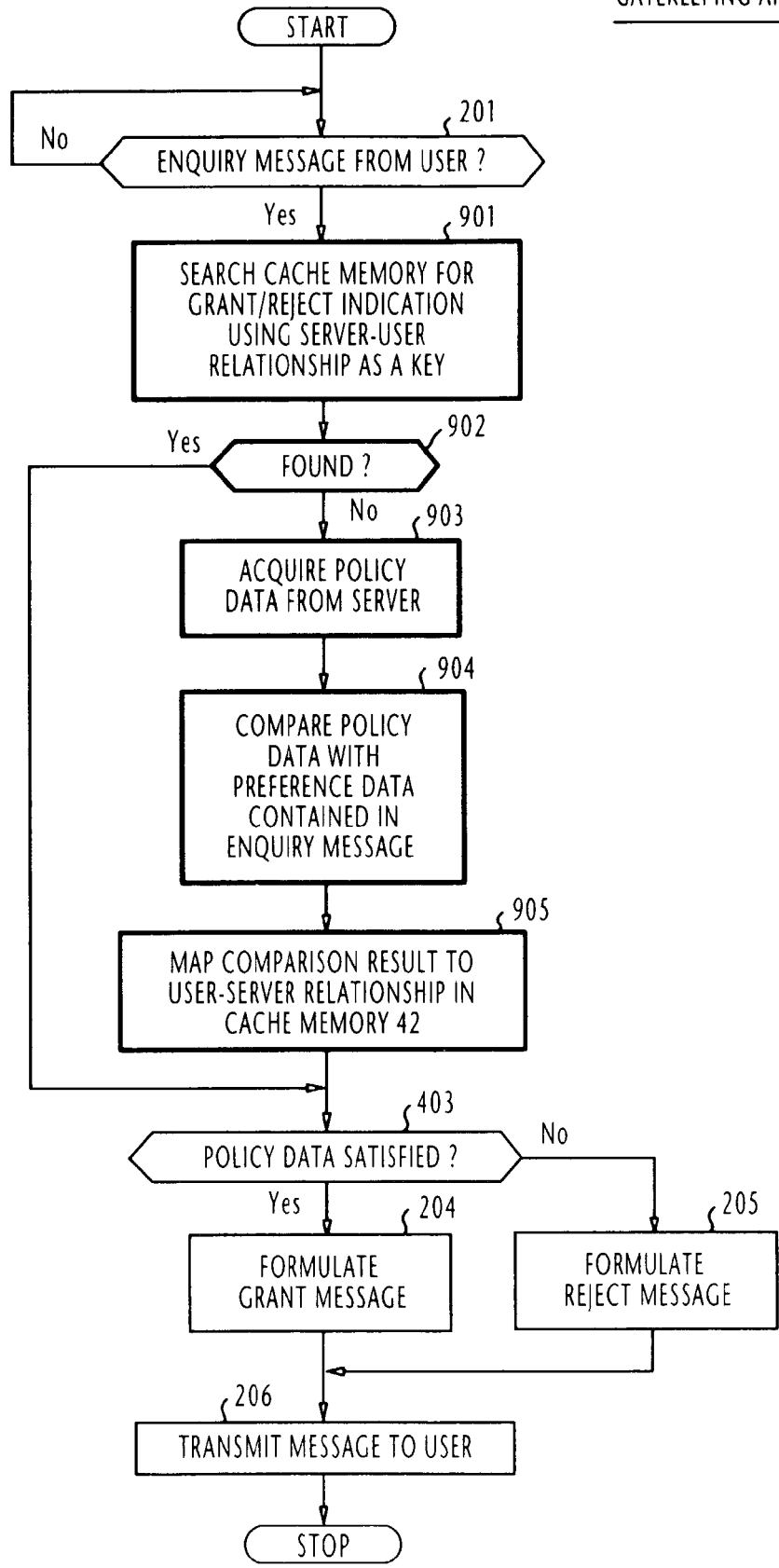
FIG. 14 is a flowchart of the operation of the gatekeeping apparatus of FIG. 13.

In FIG. 14, when the gatekeeping apparatus receives an enquiry message from the user terminal (step 201), the decision device 40 proceeds to step 901 to make a search through the cache memory 42 for a grant/reject indication by using the server-user relationship (i.e., the address of the user terminal and the content's URI in pair) indicated in the user's enquiry message. If such an indication is not found in the cache memory 42 (step 902), flow proceeds to step 903 to retrieve policy data from the content server and makes a comparison between the policy data and the user preference data contained in the user's enquiry message (step 904). The result of this comparison step is mapped in the cache memory 42 to the user-server relationship at step 905, and then flow proceeds to decision step 403. If a grant/reject indication is detected in the cache memory 42 at step 902, the CPU proceeds to decision step 403.

At decision step 403, the CPU checks to see if the user preference data satisfy the server policy data. Depending on this decision, flow proceeds to message formulation step 204 or 205 for transmission to the user terminal.

What is claimed is:

1. A content delivery system comprising:
a content server connected to a network;
a gatekeeping apparatus connected to said network; and
a user terminal for transmitting to the gatekeeping apparatus a first message containing a request for content from the network and a second message to said content server for requesting the content therefrom,
wherein said gatekeeping apparatus is responsive to said first message for making a comparison between policy data of said content server and preference data of said user terminal and making a decision as to whether or not the content can be retrieved from said content server and performing control on the transmission of said second message according to said decision, wherein said policy data and said preference data include information as to precision of parameter data for use by the content server to generate said content, wherein said user terminal includes:

a cache memory; and control circuitry for (a) making a search through said cache memory for detecting an indication of decision using an indicator of said content as a key prior to the transmission of said first message to the gatekeeping apparatus, (b) if said search fails, transmitting said first message to said gatekeeping apparatus and mapping an indication of said decision of said gatekeeping apparatus to the indicator of said content in said cache memory, and (c) if said search succeeds, acquiring said parameter data if the decision indication in said cache memory indicates that said content can be retrieved.

2. A content delivery system comprising:

a content server connected to a network;

a gatekeeping apparatus connected to said network; and a user terminal for transmitting to the gatekeeping apparatus a first message containing a request for content from the network and a second message to said content server for requesting the content therefrom, wherein said gatekeeping apparatus is responsive to said first message for making a comparison between policy data of said content server and preference data of said user terminal and making a decision as to whether or not the content can be retrieved from said content server and performing control on the transmission of said second message according to said decision, wherein said policy data and said preference data include information as to precision of parameter data for use by the content server to generate said content, wherein said gatekeeping apparatus includes:

a cache memory; and control circuitry for (a) making a search through the cache memory, when said first message is received, for detecting an indication of decision using a pair of an indicator of said content and an address of said user terminal as a key, (b) if said search fails, acquiring said policy data from said content server, making said decision by comparing the acquired policy data with said preference data and mapping an indication of the decision to said pair of the content's indicator and the user terminal address in said cache memory, and (c) if said search succeeds, performing said control according to the decision indication in said cache memory.

3. The content delivery system of claim 1, wherein said gatekeeping apparatus transmits a notification message to said user terminal for indicating said policy data of the content server, and wherein said user terminal is responsive to said notification message by displaying the policy data contained in the notification message for asking a user to determine whether the policy data are acceptable and acquiring said parameter data according to the policy data if an acceptance indication is given by the user.

4. The content delivery system of claim 2, wherein said gatekeeping apparatus transmits a notification message to said user terminal for indicating said policy data of the content server, and wherein said user terminal is responsive to said notification message by displaying the policy data contained in the notification message for asking a user to determine whether the policy data are acceptable and acquiring said parameter data according to the policy data if an acceptance indication is given by the user.

5. A method of delivering content via a communications network from a content server to a user terminal, comprising the steps of:

a) transmitting a first message from the user terminal to a gatekeeping apparatus, the first message containing a request for content from the content server;

b) receiving the first message at said gatekeeping apparatus, comparing between policy data of said content server and preference data of said user terminal and making a decision based on a result of the comparison as to whether or not the content is retrievable from said content server, wherein said policy data and said preference data include information as to precision of parameter data for use by said content server to generate said content;

c) transmitting a notification message from the gatekeeping apparatus to said user terminal for indicating said decision; and d) receiving the notification message at said user terminal and transmitting a second message to said content server only if said decision indicates that said content is retrievable, wherein the step (a) comprises the steps of:

making a search through a cache memory prior to the transmission of said first message to the gatekeeping apparatus for detecting an indication of said decision using an indicator of said content as a key;

if said search fails, transmitting said first message to said gatekeeping apparatus and mapping the indication of said decision to the address of said content server in said cache memory; and if said search succeeds, acquiring said parameter data according to said preference data if the decision indication in said cache memory indicates that said content can be retrieved.

6. A method of delivering content via a communications network from a content server to a user terminal, comprising the steps of:

a) transmitting a first message from the user terminal to a gatekeeping apparatus, the first message containing a request for content from the content server;

b) receiving the first message at said gatekeeping apparatus, comparing between policy data of said content server and preference data of said user terminal and making a decision based on a result of the comparison as to whether or not the content is retrievable from said content server, wherein said policy data and said preference data include information as to precision of parameter data for use by said content server to generate said content;

c) transmitting a notification message from the gatekeeping apparatus to said user terminal for indicating said decision; and d) receiving the notification message at said user terminal and transmitting a second message to said content server only if said decision indicates that said content is retrievable, wherein the step (b) comprises the steps of:

making a search through a cache memory in response to receipt of said first message from the user terminal for detecting an indication of decision using a pair of an indicator of said content and an address of said user terminal as a key;

if said search fails, acquiring said policy data from said content server, making said decision by comparing the acquired policy data with said preference data and mapping an indication of the decision to said pair of the content's indicator and the user-terminal address in said cache memory; and if said search succeeds, performing the step (c).

7. The method of claim 6, wherein the step (c) further comprises the step of:

transmitting a further notification message from said gatekeeping apparatus to said user terminal for indicating said policy data of the content server,
wherein the step (d) comprises the steps of:
receiving said further notification message at said user terminal and displaying the policy data indicated in the further notification message for asking a user to determine whether the policy data is acceptable; and
acquiring said parameter data according to the policy data if an acceptance indication is given by the user.

8. The method of claim 5, wherein the step (c) further comprises the step of:
transmitting a further notification message from said gatekeeping apparatus to said user terminal for indicating said policy data of the content server,
wherein the step (d) comprises the steps of:
receiving said further notification message at said user terminal and displaying the policy data indicated in the further notification message for asking a user to determine whether the policy data is acceptable; and
acquiring said parameter data according to the policy data if an acceptance indication is given by the user.

9. The method of claim 6, wherein the step (c) further comprises the step of:
transmitting a further notification message from said gatekeeping apparatus to said user terminal for indicating said policy data of the content server,
wherein the step (d) comprises the steps of:
receiving said further notification message at said user terminal and displaying the policy data indicated in the further notification message for asking a user to determine whether the policy data is acceptable; and
acquiring said parameter data according to the policy data if an acceptance indication is given by the user.

10. The method of claim 6, wherein said parameter data represents current location of the user terminal.

11. The method of claim 7, wherein said policy data and said preference data are described in P3P (Platform of Privacy Preferences Project) protocol.

12. A gatekeeping apparatus for a content delivery system in which a user terminal and a content server are connected to each other via a communications network, comprising:
a line interface connected to said network; and
control circuitry for receiving a first message via said line interface from said user terminal containing a request for a content from said content server, making a comparison between policy data of said content server and preference data of said user terminal and making a decision as to whether or not said content can be retrieved from said content server and performing control on the transmission of a second message from said user terminal to said content server according to said decision, wherein said policy data and said preference data include information as to precision of parameter data for use by said content server to generate said content, further comprising a cache memory, wherein said control circuitry performs the functions of:
making a search through the cache memory, when said first message is received, for detecting an indication of decision using a pair of an indicator of said content and an address of said user terminal as a key;
if said search fails, acquiring said policy data from said content server, making said decision by comparing the acquired policy data with said preference data and mapping an indication of the decision to said pair of the contents indicator and the user terminal address in said cache memory; and
if said search succeeds, performing said control according to the decision indication in said cache memory.

13. The gatekeeping apparatus of claim 12, wherein said control circuitry transmits a notification message to said user terminal for indicating said policy data of the content server for asking a user to determine whether the policy data are acceptable.

14. A gatekeeping method for a content delivery system in which a user terminal and a content server are connected to each other via a communications network, comprising the steps of:
a) receiving a first message from said user terminal containing a request for a content from said content server;
b) making a comparison between policy data of said content server and preference data of said user terminal and making a decision based on a result of the comparison as to whether or not said content can be retrieved from said content server, wherein said policy data and said preference data include information as to precision of parameter data for use by said content server to generate said content; and
c) performing control on a transmission of a second message from said user terminal to said content server according to said decision, the second message containing parameter data for the transmission, further comprising the steps of:
making a search through a cache memory, when said first message is received, for detecting an indication of decision using a pair of an indicator of said content and an address of said user terminal as a key;
if said search fails, acquiring said policy data from said content server, making said decision by comparing the acquired policy data with said preference data and mapping an indication of the decision to said pair of the content's indicator and the user terminal address in said cache memory; and
if said search succeeds, performing the step (c) according to the decision indication in said cache memory.

15. The gatekeeping method of claim 14, further comprising the steps of transmitting a notification message to said user terminal for indicating said policy data of the content server for asking a user to determine whether the policy data are acceptable.

16. A user terminal for a content delivery system, wherein the system includes a content server and a gatekeeping apparatus connected to each other via a communications network, and wherein said gatekeeping apparatus makes a decision as to whether or not a content can be retrieved from said content server by comparing between policy data of said content server and preference data of said user terminal, comprising:
a line interface connecting said user terminal to said network;
a cache memory; and
control circuitry for (a) making a search through said cache memory for detecting an indication of decision using an indicator of said content as a key prior to the transmission of a first message to the gatekeeping apparatus, (b) if said search fails, transmitting a first message to said gatekeeping apparatus via said line interface and mapping an indication of said decision of said gatekeeping apparatus to the indicator of said content in said cache memory, (c) if said search succeeds, acquiring parameter data for use by said content server to generate said content if the decision indication in said cache memory indicates that said content can be retrieved and transmitting a second message containing the acquired parameter data to said content server for requesting said content.

17. A method of operating a user terminal of a content delivery system, wherein the system includes a content server and a gatekeeping apparatus connected to each other via a communications network, and wherein said gatekeeping apparatus makes a decision as to whether or not a content can be retrieved from said content server by comparing between policy data of said content server and preference data of said user terminal, comprising the steps of:
   a) making a search through a cache memory for detecting an indication of a decision using an indicator of said content as a key prior to the transmission of a first message to the gatekeeping apparatus;
   b) if said search fails, transmitting a first message to said gatekeeping apparatus and mapping an indication of said decision of said gatekeeping apparatus to the indicator of said content in said cache memory;
   c) if said search succeeds, acquiring parameter data for use by said content server to generate the content if the decision indication in said cache memory indicates that said content can be retrieved; and
   d) transmitting a second message containing the acquired parameter data to said content server for requesting said content.

18. The method of claim 9, further comprising the step of mapping said acceptance indication to the indicator of said content in said cache memory and mapping a non-acceptance indication to said indicator in said cache memory when said policy data is not acceptable said user.

19. The user terminal of claim 16, wherein said gatekeeping apparatus transmits a notification message to said user terminal for indicating said policy data of the content server, and wherein said user terminal is responsive to said notification message by displaying the policy data contained in the notification message for asking a user to determine whether the policy data are acceptable and acquiring said parameter data according to the policy data if an acceptance indication is given by the user.

20. The user terminal of claim 19, wherein the user terminal maps said acceptance indication to the indicator of said content in said cache memory and maps a non-acceptance indication to said indicator in said cache memory when said policy data is not acceptable said user.

21. A content delivery system comprising:
   a content server connected to a network;
   a gatekeeping apparatus connected to said network; and
   a user terminal for transmitting a first message to said gatekeeping apparatus and a second message to said content server for requesting a content therefrom, said first message containing a request for content from said network,
   wherein said gatekeeping apparatus is responsive to said first message for making a decision as to whether or not a content can be retrieved from said content server by comparing policy data from said content server and preference data from said user terminal and wherein said gatekeeping apparatus performs control on the transmission of said second message according to said decision,
   wherein said user terminal includes:
   a cache memory; and
   control circuitry for (a) making a search through said cache memory for detecting an indication of decision using an indicator of said content as a key prior to the transmission of said first message to the gatekeeping apparatus, (b) if said search fails, transmitting said first message to said gatekeeping apparatus and mapping an indication of said decision of said gatekeeping apparatus to the indicator of said content in said cache memory, and (c) if said search succeeds, acquiring parameter data for use by said content server to generate the content if the decision indication in said cache memory indicates that said content can be retrieved.

22. The content delivery system of claim 21, wherein said gatekeeping apparatus transmits a notification message to said user terminal for indicating said policy data of the content server, and wherein said user terminal is responsive to said notification message by displaying the policy data contained in the notification message for asking a user to determine whether the policy data are acceptable and acquiring said parameter data according to the policy data if an acceptance indication is given by the user.

23. A content delivery system comprising:
   a content server connected to a network;
   a gatekeeping apparatus connected to said network; and
   a user terminal for transmitting a first message to said gatekeeping apparatus and a second message to said content server for requesting a content therefrom, said first message containing a request for content from said network,
   wherein said gatekeeping apparatus is responsive to said first message for making a decision as to whether or not a content can be retrieved from said content server by comparing policy data of said content server and preference data of said user terminal and wherein said gatekeeping apparatus performs control on the transmission of said second message according to said decision,
   wherein said gatekeeping apparatus includes:
   a cache memory; and
   control circuitry for (a) making a search through the cache memory, when said first message is received, for detecting an indication of decision using a pair of an indicator of said content and an address of said user terminal as a key, (b) if said search fails, acquiring said policy data from said content server, making said decision by comparing the acquired policy data with said preference data and mapping an indication of the decision to said pair of the content's indicator and the user terminal address in said cache memory, and (c) if said search succeeds, performing said control according to the decision indication in said cache memory.

24. The content delivery system of claim 23, wherein said gatekeeping apparatus transmits a notification message to said user terminal for indicating said policy data of the content server, and wherein said user terminal is responsive to said notification message by displaying the policy data contained in the notification message for asking a user to determine whether the policy data are acceptable and acquiring parameter data according to the policy data if an acceptance indication is given by the user.

25. A gatekeeping apparatus for a content delivery system in which a user terminal and a content server are connected to each other via a communications network, comprising:
   a cache memory;
   a line interface connecting the gatekeeping apparatus to said network; and
   control circuitry for receiving a first message via said line interface from said user terminal containing a request for a content from said content server, making a decision as to whether or not said content can be retrieved from said content server and performing control on the transmission of a second message from said user terminal to said content server according to said decision, wherein said control circuitry performs the functions of:
making a search through the cache memory, when said first message is received, for detecting an indication of decision using a pair of an indicator of said content and an address of said user terminal as a key;
if said search fails, acquiring policy data from said content server, making said decision by comparing the acquired policy data with preference data of said user terminal and mapping an indication of the decision to said pair of the content's indicator and the user terminal address in said cache memory; and
if said search succeeds, performing said control according to the decision indication in said cache memory.

26. The gatekeeping apparatus of claim 25, wherein said control circuitry transmits a notification message to said user terminal for indicating said policy data of the content server for asking a user to determine whether the policy data are acceptable.

27. The user terminal of claim 16, wherein said policy data and said preference data include information as to precision of said parameter data.

28. The method of claim 17, wherein said policy data and said preference data include information as to precision of said parameter data.

29. The content delivery system of claim 21, wherein said policy data and said preference data include information as to precision of said parameter data.

* * * * *